United States Patent
Song

(10) Patent No.: US 7,557,937 B2
(45) Date of Patent: Jul. 7, 2009

(54) SYSTEM AND METHOD FOR PRINTING A DIGITAL CAMERA IMAGE WITH TIME STAMP

(75) Inventor: Jiaping Song, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1809 days.

(21) Appl. No.: 10/092,199

(22) Filed: Mar. 4, 2002

(65) Prior Publication Data

US 2003/0164978 A1   Sep. 4, 2003

(51) Int. Cl.
*G06F 3/12* (2006.01)
(52) U.S. Cl. .................. 358/1.1; 358/1.6; 358/1.18; 358/909.1; 348/207.2
(58) Field of Classification Search ............... 358/1.18, 358/1.1, 1.6, 1.9, 1.15; 348/207.2
See application file for complete search history.

(56) References Cited

U.S. PATENT DOCUMENTS

| | | | | |
|---|---|---|---|---|
| 5,028,993 A | * | 7/1991 | Kobori et al. | 358/540 |
| 6,185,000 B1 | * | 2/2001 | Shiota et al. | 358/1.18 |
| 6,295,133 B1 | | 9/2001 | Bloomquist et al. | 358/1.1 |
| 6,307,950 B1 | | 10/2001 | Powell et al. | 382/100 |
| 6,469,738 B1 | * | 10/2002 | Hayashi | 348/231.99 |
| 6,898,316 B2 | * | 5/2005 | Zhou | 382/190 |
| 2002/0054350 A1 | * | 5/2002 | Kakigi et al. | 358/1.16 |

FOREIGN PATENT DOCUMENTS

JP     2001061089     8/1999

* cited by examiner

*Primary Examiner*—Kimberly A Williams
(74) *Attorney, Agent, or Firm*—Law Office of Gerald Maliszewski; Gerald Maliszewski

(57) ABSTRACT

A system and method are provided for interpreting time stamp information from a digital camera. The method comprises: opening a first format interpreter; receiving image information from a digital camera in a first format selected from the group including joint photographic experts group (JPEG) and tagged image file format (TIFF) formats, with a corresponding time stamp information; displaying the images with corresponding time stamps for editing; selecting the "print time stamp" option; selecting a time stamp layout for a corresponding image; converting the image information and time stamp information to bitmap information; and, supplying the edited images with corresponding time stamps for printing. Some aspects of the method further comprise: selecting miscellaneous superposition overlays for corresponding images. Then, supplying the images with corresponding time stamps for printing including supplying images with the selected superposition overlays such as text messages, backgrounds, clipart, and image borders.

16 Claims, 2 Drawing Sheets

SYSTEM AND METHOD FOR PRINTING A DIGITAL CAMERA IMAGE WITH TIME STAMP

BACKGROUND OF THE INVENTION

1. Field of the Invention

This invention generally relates to digital photography and, more particularly, to a system and method for hardcopy printing the time stamp information that accompanies the image of a corresponding digital photograph.

2. Description of the Related Art

Conventionally, when digital images are downloaded into a personal computer or specialized printer, an application must be used to open the image first, before a Joint Photographic Experts Group (JPEG) or Tag Image File Format (TIFF) image file can be operated on. Then, a printer driver is used to convert the data into a printer-ready format. Some prior art printer drivers provide users with the ability to embed some additional information into the output image. For example, users can add watermarks or backgrounds to the printing data. Prior art printer drivers work well on most image files, however, some information of the image file generated by a digital camera is lost in the printing process. Specifically, when these prior art printer drivers process images generated by a digital camera, the date or time stamp information for the corresponding pictures is lost.

Industrial printers exist that provide a limited capability for editing an image at the printer. These specialized printers allow the user to add prepress operations including adding page numbers, header/footer text, or photos and/or halftones to an existing page of text. However, these printers do not allow the user to extract date information from an image file before a hard copy of the image is made. It is also known to digitally modify raster data or embed signatures within visual images in both digital representation and print or film. However, there is no process of printing the time stamp with an image using a conventional printer.

It would be advantageous if the time stamp information that accompanies the image information downloaded from a digital camera could be used.

It would be advantageous if a user could easily select the time stamp to be included on the printed image. Likewise, it would be advantageous if the presentation and placement of time stamp information on the image could be easily manipulated by a user.

SUMMARY OF THE INVENTION

The present invention uses the printer front panel and the information from the image itself to produce user-desired output, such as including the time stamp information with the printed image. What makes the invention different from the prior art is:

1) The user does not need a specific print driver configured to modify the bitmap data stream;

2) The user does not need a particular viewer or reader to open the image prior to sending the image to the printer;

3) The information from the image is fully utilized to produce user-desired output; and, 4) The user can use the printer's front panel to locate the time stamp information on the printed image.

The present invention adds a JPEG or TIFF interpreter to the printer controller, and utilizes the printer front panel to communicate with the user. Since the printer controller receives all the image file information when the image is downloaded from the camera, the time stamp information can be embedded into the bitmap data sent to the printer engine. By employing the present invention, the images when printed, will look similar to those developed by photo-processing centers wherein the date information is located on or adjacent to the image. In contrast to images printed by photo-processing centers, user communications with the printer's front panel are used to select where the date information is located on the image, or if the date information is printed at all.

Accordingly, a method is provided for interpreting time stamp information from a digital camera. The method comprises: opening a first format interpreter; receiving image information from a digital camera in a first format selected from the group including joint photographic experts group (JPEG) and tagged image file format (TIFF) formats, with a corresponding time stamp information; displaying the images with corresponding time stamps for editing; selecting the "print time stamp" option; selecting a time stamp layout for a corresponding image; converting the image information and time stamp information to bitmap information; and, supplying the edited images with corresponding time stamps for printing.

Some aspect of the method further comprise: selecting miscellaneous superposition overlays for corresponding images. Then, supplying the images with corresponding time stamps for printing including supplying images with the selected superposition overlays such as text messages, backgrounds, clipart, and image borders.

Additional details of the above-described method, and a system for interpreting time stamp information from a digital camera are provided below.

DETAILED DESCRIPTION OF THE PREFERRED EMBODIMENTS

Figure 1:
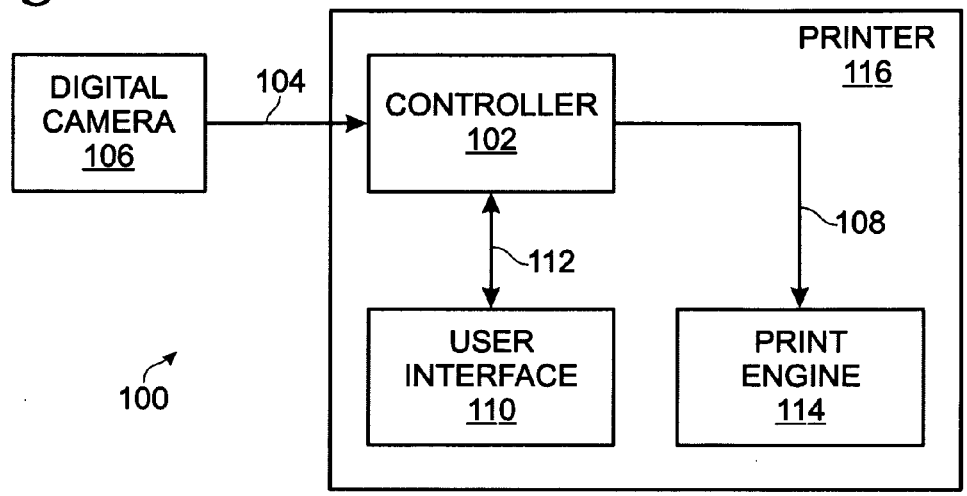
FIG. 1 is a schematic block diagram illustrating the present invention system for interpreting time stamp information from a digital camera.

FIG. 1 is a schematic block diagram illustrating the present invention system for interpreting time stamp information from a digital camera. The system 100 comprises a controller 102 having a port on line 104 to receive image information from a digital camera 106 in a first format. Conventionally, the connection represented by line 104 is universal serial bus (USB), however, the present invention is not limited to any particular interface protocol. The controller 102 receives image information from the digital camera 106 in a first format that includes the JPEG or TIFF formats. However, the present invention system is not limited to any particular type of image format. The image information is supplied with a corresponding time stamp. The controller 102 has a port on line 108 to supply images with corresponding time stamps, converted into bitmap information.

A user interface 110 has a port on line 112 connected for communication with the controller 102. A printer engine 114 has a port connected to the controller 102 on line 108 for accepting the images with corresponding time stamps for printing. A specialized photography printer 116 is shown encompassing the user interface 110 and printer engine 114 functions. In some aspects, the printer can be a conventional dot-matrix or laser printer associated with a PC. As is understood in the art, lines 112 and 108 may be a common bus in some aspects of the system 100.

Figure 2:
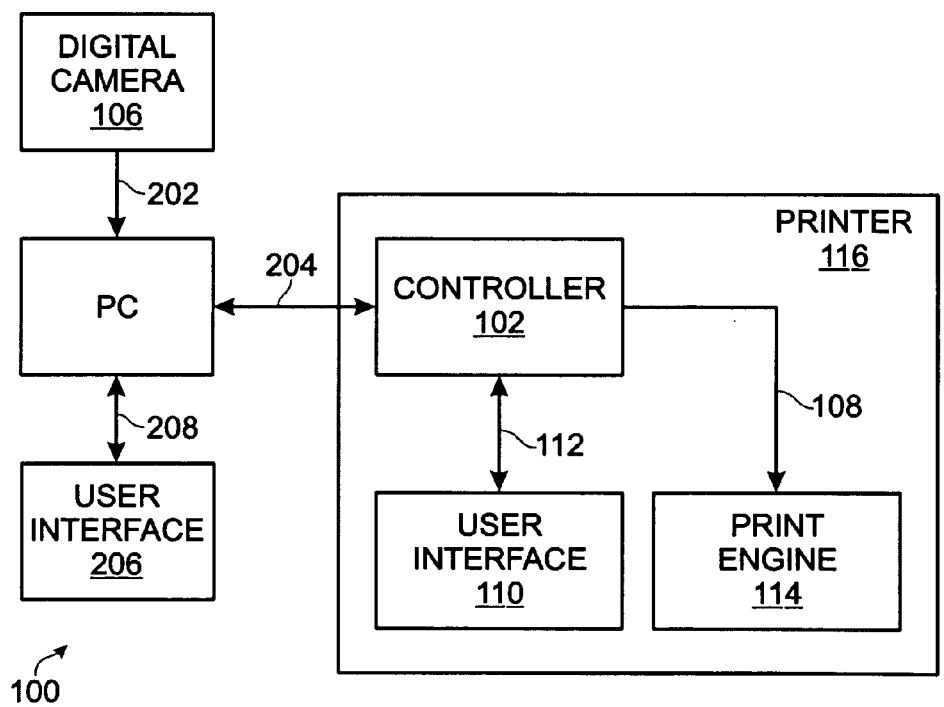
FIG. 2 is a schematic block diagram featuring a different aspect of the present invention system of FIG. 1.

FIG. 2 is a schematic block diagram featuring a different aspect of the present invention system 100 of FIG. 1. As shown, the digital camera 106 is connected to a personal computer (PC) 200 on line 202. The PC 200 is connected to the printer 116 via line 204. In some aspects of the system 100, line 204 can be a parallel port cable or USB connection. Alternately, line 204 can represent a network connection, such as a local area network (LAN) connection, to name but one example. The user interface 110 can be a printer front panel, as in FIG. 1, or a display and keyboard user interface 206 (or equivalent) connected to the PC 200 on line 208.

Referring now to both FIGS. 1 and 2, regardless of which system aspect is used, the user interface 110/206 accepts time stamp print user prompts and supplies instructions to the controller 102 for printing a time stamp. The controller 102 supplies time stamp information, with its corresponding image, as bitmap information on line 108 in response time stamp print commands from the user interface.

In some aspects of the system 100, the user interface 110/206 receives images for display. The user interface 110/206 also receives image modification user prompts. For example, the user may be able to magnify a portion of the image in response. Conventionally, there are many image modifications that can be made to digital photographs before they are hardcopy printed. The user interface 110/206 supplies commands to the controller 102 for modifying the images with corresponding time stamps, and the controller 102 modifies the bitmap image data in response to commands from the user interface.

The user interface 110/206 accepts user prompts for selecting a time stamp layout on a corresponding image, and supplies the time stamp layout commands to the controller 102. The controller 102 accepts the time stamp layout information and provides images with corresponding time stamp layouts for printing in response to the time stamp layout commands. More specifically, the time stamp layouts include features such as the location of the time stamp on the image, the time stamp font style, the time stamp font size, and the time format. The time format refers to expression of a date as "Jan. 1, 2002", or "01/01/2002". The time format also controls the ordering of the day, month, and year. In some aspects of the invention, the time stamp information includes the time (the hour and minute of the day). As above, the user has the option of representing the time in many formats. For example, the time can be represented as AM/PM or military time.

In some aspects of the system 100, the user interface 110/206 also accepts prompts for selecting miscellaneous superposition overlays for corresponding images. The controller 102 supplies images for printing with the corresponding superposition overlays in response to the miscellaneous superposition overlay prompts. More specifically, superposition overlays such as text messages, backgrounds, clipart, and image borders can be created and sent to the printer engine 114 as bitmap data.

Functional Description

The present invention system permits a user to modify or add information to a printed image through a user interface, such as a printer front panel. Once the printer controller receives the data, it invokes the proper interpreter such as JPEG or TIFF to parse the data and embeds the user desired information (date, description etc) to the image data.

In one aspect (FIG. 1), the printer consists of an engine, controller, user interface, and a USB port. The USB port allows the user to directly connect a digital camera's flash card to the printer. Once the card is inserted into the smart media, the printer controller starts reading and parsing the data. Once this process is completed, the images are shown on the printer's front panel or on the printer's embedded web page if the printer has one. At this point, the user can select the image they want to print. By monitoring the current setting of the front panel, the controller makes decisions on whether to embed the date (time stamp) information in the bitmap information being sent to the print engine. If users choose to include the date information, certain fonts can also be selected for the conversion of JPEG or TIFF date information into the raster or bitmap data. According to the orientation of the image, the time stamp raster data is then embedded into the proper part (i.e., lower left part for portrait orientation and lower right part for landscape orientation) of the image data. Then, the whole image data (image plus time stamp) is converted to bitmap data rendered to the printer engine for printing.

The user interface also gives users the ability to add a "picture frame" and descriptive text to the image. For example, if the images taken from the digital camera are from a child's birthday party, the user may want to type "Sam's 7th Birthday Party". This descriptive text is then included on the printed image. The descriptive text "Sam's 7th Birthday Party" will be printed on all of the images sent to the printer until the user changes it. From the front panel, the user may embed other description information including names and clipart that is printed on the image.

Figure 3:
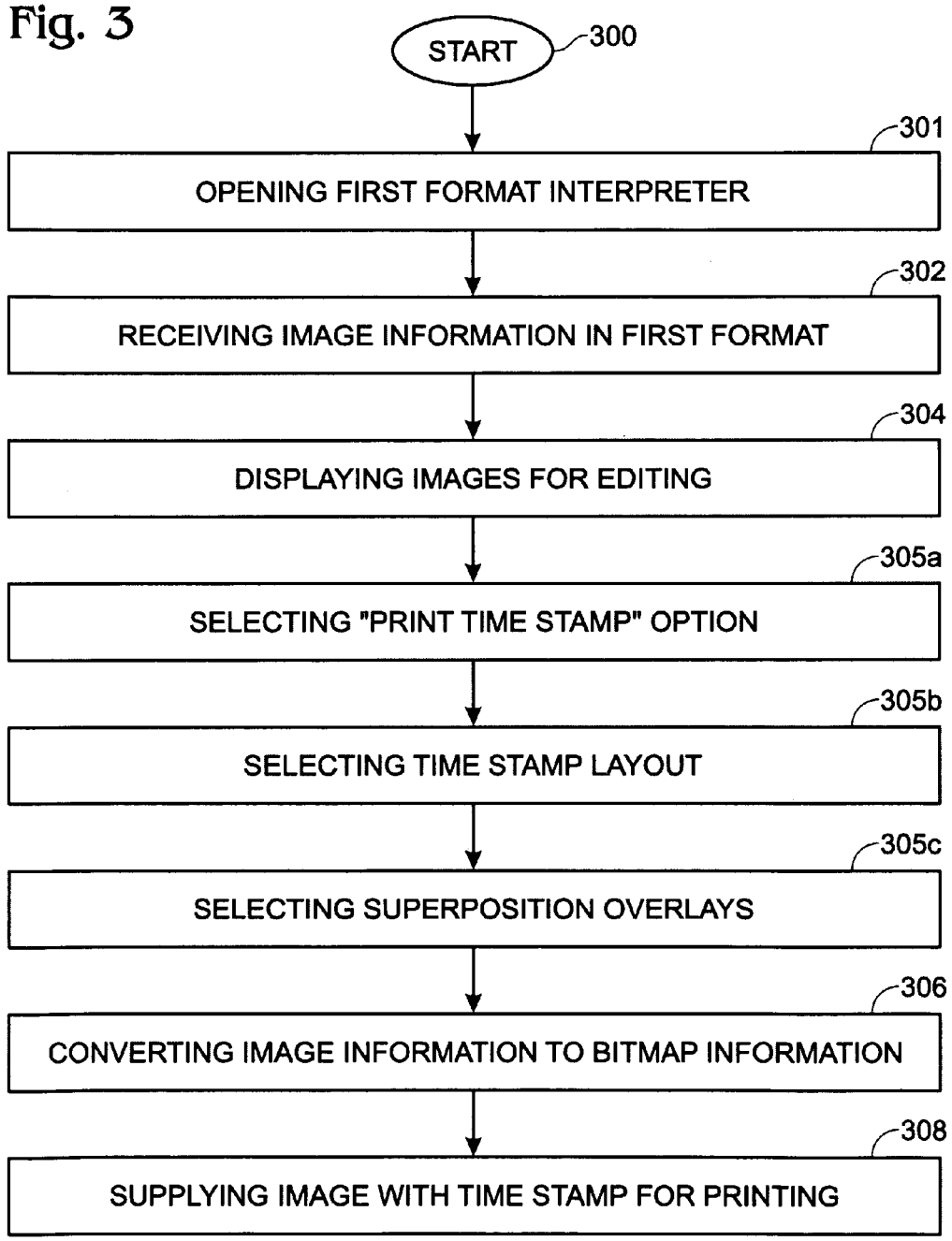
FIG. 3 is a flowchart illustrating the present invention method for interpreting time stamp information from a digital camera.

FIG. 3 is a flowchart illustrating the present invention method for interpreting time stamp information from a digital camera. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300. Step 302 receives image information from a digital camera in a first format with corresponding time stamp information. In some aspects, receiving image information from a digital camera in a first format in Step 302 includes receiving information in a first format such as JPEG or TIFF formats. Step 304 displays the images with corresponding time stamps for editing. Step 306 converts the image information and time stamp information to bitmap information. Step 308 supplies the images with corresponding time stamps for printing. If edited, the edited images with corresponding time stamps are supplied for printing.

In some aspects, Step 301 opens a first format interpreter. Then, receiving image information from a digital camera in a first format in Step 302 includes using the first format interpreter to accept the image information and corresponding time stamp. Converting the image information and time stamp to bitmap information in Step 306 includes using the first format interpreter to convert the image information and corresponding time stamp into bitmap information.

In some aspects of the method, Step 305a selects the "print time stamp" option. Then, converting the image information and time stamp to bitmap information in Step 306 includes converting the time stamp into bitmap information in response to selecting the "print time stamp" option. Note, in this aspect of the method the time stamp information is not printed unless the "time stamp option" is selected. Alternately, the method can automatically print the time stamp information.

In other aspects, Step 305b selects a time stamp layout for a corresponding image. Selecting the time stamp layout for the corresponding image includes selecting features such as the location of the time stamp on the image, the time stamp font style, the time stamp font size, and the time format. If the time stamp includes hour and minute information, this information can also be selectively included as part of the time stamp. Then, supplying the images with corresponding time stamps for printing in Step 308 including supplying the image with the selected time stamp layout.

In some aspects of the method, Step 305c selects miscellaneous superposition overlays for corresponding images. Selecting miscellaneous superposition overlays for corresponding images includes selecting an overlay such as a text messages, backgrounds, image borders, and clipart. Then, supplying the images with corresponding time stamps for printing in Step 308 including supplying images with the selected superposition overlays.

A system and method have been presented for interpreting time stamp information downloaded from a digital camera, so that it can be included in the printed image. Specific examples have been given as to how the invention may be enabled, but the invention is not necessarily limited to just these examples. Likewise, examples have been given for the kind of modifications that can be performed on a printed image. Again, the invention is not limited to just these examples. Other variations and embodiments of the invention will occur to those skilled in the art.

I claim:

1. A method for using a printer to interpret time stamp information from a digital camera, the method comprising:
   receiving image information from a digital camera in a first format with corresponding time stamp information at a printer interface;
   converting the image information and time stamp information to bitmap information;
   at a printer front panel, displaying the images with corresponding time stamps for editing;
   in response to the editing, embedding time stamp bitmap information in the image bitmap information; and,
   supplying the edited images with corresponding time stamps to a print engine for printing.

2. The method of claim 1 further comprising:
   opening a first format interpreter;
   wherein receiving image information from a digital camera in a first format includes using the first format interpreter to accept the image information and corresponding time stamp; and,
   wherein converting the image information and time stamp to bitmap information includes using the first format interpreter to convert the image information and corresponding time stamp into bitmap information.

3. The method of claim 2 further comprising:
   using the printer front panel to select the "print time stamp" option; and,
   wherein converting the image information and time stamp to bitmap information includes converting the time stamp into bitmap information in response to selecting the "print time stamp" option.

4. The method of claim 3 wherein receiving image information from a digital camera in a first format includes receiving information in a first format selected from the group including joint photographic experts group (JPEG) and tagged image file format (TIFF) formats.

5. The method of claim 3 further comprising:
   using the printer front panel to selecting a time stamp layout for a corresponding image; and,
   wherein supplying the images with corresponding time stamps for printing including supplying the image with the selected time stamp layout.

6. The method of claim 5 wherein selecting the time stamp layout for the corresponding image includes selecting from the group including the location of the time stamp on the image, the time stamp font style, the time stamp font size, and the time format.

7. The method of claim 5 further comprising:
   using the printer front panel to select miscellaneous superposition overlays for corresponding images; and,
   wherein supplying the images with corresponding time stamps for printing including supplying images with the selected superposition overlays.

8. The method of claim 7 wherein selecting miscellaneous superposition overlays for corresponding images includes selecting superposition overlays from the group including text messages, backgrounds, clipart, and image borders.

9. A method for a printer to interpret time stamp information from a digital camera, the method comprising:
   receiving image information at a printer interface from a digital camera in a first format selected from the group including joint photographic experts group (JPEG) and tagged image file format (TIFF) formats, with a corresponding time stamp information;
   at a printer front panel, displaying the images with corresponding time stamps for editing;
   using the printer front panel to select the "print time stamp" option;
   using the printer front panel to select a time stamp layout for a corresponding image;
   converting the image information and time stamp information to bitmap information;
   in response to the selected time stamp layout option, embedding time stamp bitmap information in the image bitmap information; and,
   supplying the edited images with corresponding time stamps to a print engine for printing.

10. A printer having a capacity for manipulating time stamp information from a digital camera, the printer comprising:
   a controller having a port to receive image information from a digital camera in a first format with a corresponding time stamp and a port to supply images with corresponding time stamps, converted into bitmap information;
   a user interface front panel having a port connected for communication with the controller, the user interface front panel accepting time stamp print user prompts and supplying instructions to the controller for printing a time stamp;
   wherein the controller supplies time stamp bitmap information embedded in the corresponding image bitmap information, in response to the time stamp print commands from the user interface front panel; and,
   a printer engine having a port connected to the controller for accepting the images with corresponding time stamps for printing.

11. The system of claim 10 wherein the user interface front panel receives images for display, receives image modification user prompts, and supplies commands to the controller for modifying the images with corresponding time stamps; and,
   wherein the controller modifies the bitmap image data in response to commands from the user interface front panel.

12. The system of claim 11 wherein the controller receives image information from the digital camera in a first format selected from the group including joint photographic experts group (JPEG) and tagged image file format (TIFF) formats.

13. The system of claim 11 wherein the user interface front panel accepts user prompts for selecting a time stamp layout on a corresponding image, and supplies the time stamp layout commands to the controller; and, wherein the controller accepts the time stamp layout information and provides images with corresponding time stamp layouts for printing in response to the time stamp layout commands.

14. The system of claim 13 wherein the user interface front panel accepts prompts for selecting the time stamp layouts selected from the group including the location of the time stamp on the image, the time stamp font style, the time stamp font size, and the time format.

15. The system of claim 13 wherein the user interface front panel accepts prompts for selecting miscellaneous superposition overlays for corresponding images; and, wherein the controller supplies images for printing with the corresponding superposition overlays in response to the miscellaneous superposition overlay prompts.

16. The system of claim 15 wherein the user interface front panel accepts prompts for miscellaneous superposition overlays selected from the group including text messages, backgrounds, clipart, and image borders.

* * * * *